US011341001B1

(12) United States Patent
Brahmadesam et al.

(10) Patent No.: US 11,341,001 B1
(45) Date of Patent: May 24, 2022

(54) UNLIMITED DATABASE CHANGE CAPTURE FOR ONLINE DATABASE RESTORES

(71) Applicant: Amazon Technologies, Inc., Seattle, WA (US)

(72) Inventors: Murali Brahmadesam, Bangalore (IN); Changan Han, Kirkland, WA (US)

(73) Assignee: Amazon Technologies, Inc., Seattle, WA (US)

(*) Notice: Subject to any disclaimer, the term of this patent is extended or adjusted under 35 U.S.C. 154(b) by 146 days.

(21) Appl. No.: 16/910,820

(22) Filed: Jun. 24, 2020

(51) Int. Cl.
*G06F 7/02* (2006.01)
*G06F 16/00* (2019.01)
*G06F 11/14* (2006.01)
*G06F 16/242* (2019.01)
*G06F 16/27* (2019.01)
*G06F 16/23* (2019.01)

(52) U.S. Cl.
CPC ...... *G06F 11/1471* (2013.01); *G06F 11/1451* (2013.01); *G06F 16/2358* (2019.01); *G06F 16/2423* (2019.01); *G06F 16/27* (2019.01)

(58) Field of Classification Search
CPC .. G06F 11/1471; G06F 16/27; G06F 16/2358; G06F 16/2423; G06F 11/1451
See application file for complete search history.

(56) References Cited

U.S. PATENT DOCUMENTS 9,734,021 B1* 8/2017 Sanocki ............ H04L 41/0654
10,180,951 B2* 1/2019 Gupta .................. G06F 16/219
2020/0285542 A1* 9/2020 Deshpande ......... G06F 11/1461

OTHER PUBLICATIONS

Unpublished U.S. Patent Application for Online Restore for Database Engines, U.S. Appl. No. 15/616,888, filed Jun. 7, 2017.

* cited by examiner

*Primary Examiner* — Bruce M Moser
(74) *Attorney, Agent, or Firm* — Nicholson De Vos Webster & Elliott LLP

(57) ABSTRACT

Techniques are described for enabling a relational database service of a cloud provider network to provide online restore or "backtrack" capabilities that are unlimited in terms of an amount of time in the past to which a database can be restored. Database systems typically provide restoration capabilities that allow users to undo or revert to a prior state of the database. Restoring a database to a prior state can be useful in many different scenarios. For example, a user might restore a database to remove or rollback errors introduced into a database as a result of inadvertent changes to data or to a schema of the data stored in the database. As another example, database administrators or other users can use restore operations as part of testing modifications to a database schema when developing applications or other tools that use the database.

20 Claims, 11 Drawing Sheets

UNLIMITED DATABASE CHANGE CAPTURE FOR ONLINE DATABASE RESTORES

BACKGROUND

Database systems provide restoration capabilities that allow users to undo or revert to a prior state of the database. Restoring a database to a prior state can be useful in many different scenarios. For example, a user might restore a database to remove or rollback errors introduced into a database as a result of inadvertent changes to data or to a schema of the data stored in the database. As another example, database administrators or other users can use restore operations as part of testing modifications to a database schema when developing applications or other tools that use the database.

BRIEF DESCRIPTION OF DRAWINGS

Various embodiments in accordance with the present disclosure will be described with reference to the drawings, in which.

DETAILED DESCRIPTION

Figure 1:
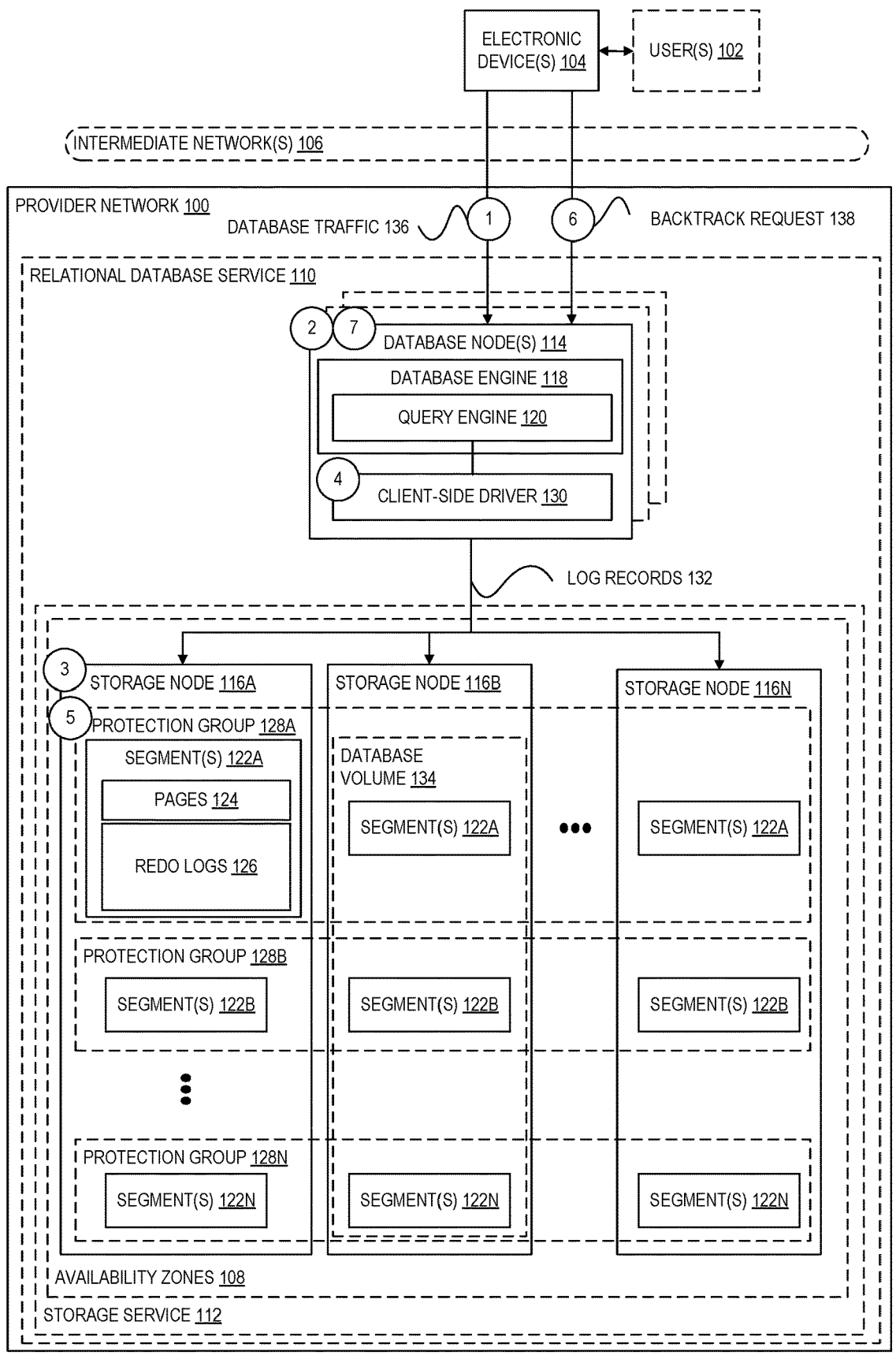
FIG. 1 is a diagram illustrating an environment including a relational database service that enables users to create, manage, and use relational databases and that further enables users to perform online restore (or "backtrack") operations, according to some embodiments.

The present disclosure relates to methods, apparatus, systems, and non-transitory computer-readable storage media for enabling a relational database service of a cloud provider network to provide online restore, or "backtrack," capabilities that are unlimited in terms of an amount of time in the past to which a database can be restored. Database systems typically provide restoration capabilities that allow users to undo or revert to a prior state of the database. Restoring a database to a prior state can be useful in many different scenarios. For example, a user might restore a database to remove or rollback errors introduced into a database as a result of inadvertent changes to data or to a schema of the data stored in the database. As another example, database administrators or other users can use restore operations as part of testing modifications to a database schema when developing applications or other tools that use the database.

When a traditional database modifies a data page (e.g., responsive to a write operation), the database engine generates a redo log record and invokes a log applicator that applies the redo log record to the in-memory before-image of the page to produce its after-image. In some embodiments, however, a relational database service instead off-loads redo log processing from a database engine to a separate, distributed storage service that builds its storage volumes in fixed size logical blocks called "protection groups." The fixed size of such protection groups may be designed, for example, to enable the relational database to achieve desirable mean time to repair (MTTR) characteristics for each segment of the database. In this environment, the database engine is generally unaware of the fact that storage nodes of the storage system are retaining a history of redo log records and pages within the fixed size protection groups. Once an amount redo log records for any given protection group reaches the fixed size limit, the storage nodes communicate to a database head node (e.g., running a database engine) the need to garbage collect some of the redo log data on the storage nodes. This results in the relational database service typically being unable to satisfy backtrack requests outside of the amount of redo log data that can be stored in a fixed size protection group.

Embodiments described herein enable a relational database service to provide an unlimited database backtrack window for users desiring longer periods of instant or "online" database recovery. According some embodiments, to enable an unlimited backtrack window, a relational database service creates and manages "versioned" protection groups used to build a database volume, where new versions of individual protection groups are created upon protection groups approaching the fixed protection group size limit. In this manner, an unlimited amount of redo logs and other backtrack information can be stored across any number of fixed size, versioned protection groups. Among other benefits, the ability to store an unlimited amount of redo logs and other backtrack data enables the relational database service to provide point-in-time cloning functionality that can be performed across an entire lifespan of a database.

FIG. 1 illustrates an exemplary system including a relational database service that enables unlimited online restore, or backtrack, capabilities, according to some embodiments. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users (e.g., users 102) may use electronic device(s) 104 to interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) (e.g., including availability zones 108) connected to one another via a private high-speed network, for example a fiber communication connection. An AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The provider network 100 illustrated in FIG. 1 includes a relational database service 110, among any number of other services. According to some embodiments, the relational database service 110 enables users to create, manage, and use relational databases in a cloud-based environment in a manner that provides enhanced security, availability, and reliability relative to other database environments. In some embodiments, the relational database service 110 features a distributed, fault-tolerant, and self-healing storage system that automatically scales (e.g., implemented in part using a scalable storage service 112). In some embodiments, a database system provided by a relational database service 110 organizes the basic operations of a database (e.g., query processing, transaction management, caching, and storage) into tiers that can be individually and independently scalable. For example, in some embodiments, each database instance provided by a relational database service 110 includes a database tier (which may include one or more database nodes 114, sometimes also referred to as "head nodes"), a separate and distributed storage system (which may include multiple storage nodes 116 that collectively perform some of the operations traditionally performed in the database tier of existing database systems), and a backup storage tier.

In general, a database is a set of data, collection of records, or other grouping of data objects stored in a data store. In some embodiments, a data store includes one or more directly or network-attached storage devices accessible to a database engine 118 (e.g., block-based storage devices like hard disk drives or solid-state drives). As indicated above, in some embodiments, the data store is managed by a separate storage service 112. In some embodiments, management of the data store at a separate storage service 112 includes distributing the data amongst multiple different storage nodes (e.g., storage nodes 116A-116N) to provide redundancy and availability for the data.

In some embodiments, the data for a database is stored in one or more portions of the data store, such as data pages. One or multiple data values, records, or objects may be stored in a data page. In some embodiments, data pages further include metadata or other information for providing access to the database. For example, data pages can store data dictionaries, transaction logs, undo and redo log records, and so forth. A query engine 120 of a database engine 118 performs access requests (e.g., requests to read, obtain, query, write, update, modify, or otherwise access) based on state information. The state information can include, for example, data dictionaries, undo logs, transaction logs/tables, indexing structures, mapping information, data page caches or buffers, and the like, or any other information used to perform access requests with respect to the database. For example, state information may include mapping information (e.g., an index) used to obtain data records that match certain search criteria (e.g., query predicates).

In some embodiments, some operations of a database (e.g., backup, restore, recovery, log record manipulation, and/or various space management operations) are offloaded from the database engine 118 to the storage layer and distributed across multiple storage nodes and storage devices. For example, in some embodiments, rather than a database engine 118 applying changes to a database (or data pages thereof) and then sending the modified data pages to the storage layer, the application of changes to the stored database (and data pages thereof) is the responsibility of the storage layer itself. According to embodiments, a database engine 118 sends redo log records, rather than modified data pages, to the storage layer. The storage layer then performs redo processing (e.g., the application of the redo log records) in a distributed manner (e.g., by a background process running on the storage nodes 116A-116N).

In some embodiments, log sequence numbers (LSNs) are assigned to the redo log records from a log sequence number space. In some embodiments, crash recovery (e.g., the rebuilding of data pages from stored redo log records) is performed by the storage layer and may also be performed by a distributed background process. In some embodiments, the storage layer maintains backup versions of data volumes in a separate storage system (e.g., in another storage service implemented as part of the cloud provider network 100) by leveraging peer-to-peer replication among storage nodes to identify and obtain new updates to data volumes for inclusion in backup versions.

In some embodiments, because only redo logs (and not modified data pages) are sent to the storage layer, there is much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In some embodiments, the database systems described herein may retain much of the structure of the upper half of a database instance (e.g., query parsing and query optimization layer, a query execution layer, and a transactionality and consistency management layer) but may redistribute responsibility for at least portions of the backup, restore, snapshot, recovery, and various space management operations to the storage tier. Redistributing functionality in this manner and tightly coupling log processing between the database tier and the storage tier may improve performance, increase availability and reduce costs, when compared to previous approaches to providing a scalable database, in some embodiments. For example, network and input/output bandwidth requirements may be reduced since only redo log records (which are much smaller in size than actual data pages) may be sent across nodes or persisted within the latency path of write operations. In addition, the generation of data pages can be performed independently in the background on each storage node (as foreground processing allows) without blocking incoming write operations. In some embodiments, the use of log-structured, non-overwrite storage may allow copy creation, backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and metadata associated with that data, such as redo log records) across multiple storage nodes. For example, data and metadata of a database may be replicated locally (e.g., within a single availability zone 108 in which a collection of storage nodes 116 executes on its own physically distinct, independent infrastructure) and across availability zones 108 in a single region or in different regions.

In some embodiments, the database systems described herein support a standard or custom API for a variety of database operations. For example, the API may support operations for creating a database, creating a table, altering a table, creating a user, dropping a user, inserting one or more rows in a table, copying values, selecting data from within a table (e.g., querying a table) canceling or aborting a query, creating a snapshot, performing an online restore or "backtrack" operation, among other possible operations.

In some embodiments, each data page may be stored in a segment, such that each segment (e.g., segment 122A) stores a collection of one or more data pages 124 and redo logs 126 for each data page that it stores. Thus, redo logs may be segmented to the protection group 128 of which the segment is a member. In some embodiments, data pages and redo logs are mirrored across multiple storage nodes, according to a variable configuration, such as in a protection group 128 (which may be specified by the client on whose behalf the databases are being maintained in the database system). For example, in some embodiments, one, two, or three copies of the data or redo logs may be stored in each of one, two, or three different availability zones or regions, according to a default configuration, an application-specific durability preference, or a client-specified durability preference.

In some embodiments, a user's database created using a relational database service 110 is implemented by one or more database nodes 114, each hosting a database engine (e.g., database engine 118), and a fleet of storage nodes 116. In some embodiments, a database engine 118 includes various components associated with a traditional database kernel, including a query engine 120 and other components implementing transactions, locking, buffer cache, access methods, and undo management. In some embodiments, a database engine 118 receives requests (e.g., queries to read or write data, etc.) from various client applications or users, parses the requests, optimizes the requests, and develops an execution plan to carry out the associated database operations. In some embodiments, the database engine 118 returns query responses to client applications, which may include write acknowledgements, requested data pages (or portions thereof), error messages, and other responses as appropriate.

In some embodiments, a database node 114 is responsible for receiving SQL requests from client applications through a JDBC or ODBC interface and performing SQL processing and transaction management (which may include locking) locally. However, rather than generating data pages locally, the database node 114 (or various components thereof) generates redo log records and sends the redo log records to the appropriate storage nodes 116 of a separate distributed storage system. In some embodiments, a client side driver 130 for the distributed storage system is hosted on the database node 114 and is responsible for routing redo log records 132 to the storage system node(s) 116 that store the segments (or data pages thereof) to which those redo log records 132 are directed.

For example, in some embodiments, each segment 122 of a database is replicated (or otherwise made durable) on multiple storage system nodes 116 that form a "protection group." In such embodiments, the client-side driver 130 tracks the storage nodes 116 on which each segment is stored and routes redo logs 132 to all of the nodes on which a segment is stored (e.g., asynchronously and in parallel) when a client request is received. As soon as the client-side driver 130 receives an acknowledgment back from a write quorum of the storage nodes 116 in the protection group (which may indicate that the redo log record has been written to the storage node), it sends an acknowledgment of the requested change to the database tier (e.g., to the database node 114). For example, in embodiments in which data is made durable through the use of protection groups 128, the database node 114 may not be able to commit a transaction until and unless the client-side driver 130 receives a reply from enough storage nodes 116 to constitute a write quorum, as may be defined in a protection group policy for the data.

In some embodiments, the database tier (or, more specifically, a database node 114) includes a cache in which recently accessed data pages are held temporarily. In such embodiments, if a write request is received that targets a data page held in such a cache, in addition to sending a corresponding redo log record 132 to the storage layer, the database engine applies the change to the copy of the data page held in its cache. A data page held in this cache may not ever be flushed to the storage layer and may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes but may exist only on the database node 114 for a given database instance. Therefore, there may be no cache coherency or consistency issues to manage.

As indicated above, in some embodiments, a database node 114 includes a client-side storage driver 130, which routes read requests or redo log records 132 to various storage nodes 116 within the storage service 112, receives write acknowledgements from the storage service 112, receives requested data pages from the storage service 112, or return data pages, error messages, or other responses to a database engine 118. In some embodiments, the client-side driver 130 running on the database node 114 may expose a private interface to one or more other components (e.g., other database engines or virtual computing service components). In some embodiments, storage for a database instance in the storage tier may be modeled as a single volume that can grow in size without limits and that can have an unlimited number of IOPS associated with it. When a volume is created, it may be created with a specific size, with specific availability/durability characteristics (e.g., specifying how it is to be replicated) and with an IOPS rate associated with it (e.g., both peak and sustained). For example, in some embodiments, a variety of different durability models may be supported, and users may be able to specify, for their database, a number of replication copies, availability zones, or regions and whether replication is synchronous or asynchronous based upon their durability, performance, and cost objectives.

In some embodiments, the client-side driver 130 may maintain metadata about the volume and directly send asynchronous requests to each of the storage nodes 116 necessary to fulfill read and write requests without requiring additional hops between storage nodes. In some embodiments, the volume metadata indicates which protection groups 128, and their respective storage nodes 116, maintain which partitions of the volume. For example, in some embodiments, in response to a request to make a change to a database, the client-side driver 130 determines the protection group 128, and its one or more storage nodes 116 that are implementing the storage for the targeted data page, and routes the redo log record(s) 132 specifying that change to those storage nodes. The storage nodes 116 may then be responsible for applying the change specified in the redo log record to the targeted data page at some point in the future. As writes are acknowledged back to the client-side driver 130, the client-side driver 130 may advance the point at which the volume is durable and may acknowledge commits back to the database tier, in some embodiments. As previously noted, in some embodiments, the client-side driver 130 may not ever send data pages to the storage nodes 116.

This may not only reduce network traffic but may also remove the need for the checkpoint or background writer threads that constrain foreground processing throughout in previous database systems.

In some embodiments, many read requests may be served by the database node 114 cache. However, write requests may require durability since large scale failure events may be too common to allow only in-memory replication. Therefore, the systems described herein may minimize the cost of the redo log record write operations that are in the foreground latency path by implementing data storage in the storage tier as two regions: a small append-only log-structured region into which redo log records 132 are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads including applications in which reads are largely cached.

In some embodiments, copies of databases may be created in the storage tier that share data pages with the source of the copy. For example, a copy of a portion of a database (e.g., an extent of a database volume 134) may be stored on the same storage node as the source database and include pointers to data pages stored in the source database so that the resulting amount of storage consumed by the copy is limited to storing changes to data pages that differ from the original copy, providing a copy-on-write technique for creating and updating copies of a database. Although not illustrated in FIG. 1, in some embodiments, the storage nodes 116 also interface with a separate backup data store, system, service, or device. In this example, various data, such as data pages, log records, and any other data maintained by distributed storage service internal clients, such as relational database service 110 or other virtual computing services, or external clients, may be sent periodically to a backup data store.

In some embodiments, different storage policies are implemented by the relational database service 110. Examples of such storage policies include a durability policy (e.g., a policy indicating the number of instances of a database (or data pages thereof) that will be stored and the number of different storage nodes on which they will be stored) and a load balancing policy (which may distribute databases, or data pages thereof, across different storage nodes, volumes, or disks in an attempt to equalize traffic). In addition, different storage policies may be applied to different types of stored items by various services. For example, in some embodiments, the storage service may implement a higher durability for redo log records than for data pages, etc.

As indicated above, in some embodiments, a relational database service 110 replicates users' databases to provide resiliency to failure. In some embodiments, a user's database is partitioned into fixed size segments 122, each of which is replicated across the storage nodes 116. In some embodiments, each set of fixed sized segments replicated across the storage nodes 116 is grouped into a "protection group" (e.g., one of protection groups 128), such that each protection group consists of N fixed size segments organized across M availability zones 108. In some embodiments, a logical database volume 134 used to store the data of a database is thus a concatenated set of protection groups 128, physically implemented using a fleet of storage nodes (e.g., including storage nodes 116A-116N) provided as virtual hosts with attached SSDs. In some embodiments, the protection groups that constitute a volume are allocated as the volume grows, where the relational database service 110 may support volumes that can grow up to a defined size limit (e.g., 64 TB or any other limit).

In some embodiments, a storage node 116 includes hardware and software implementing various segment management functions. For example, each storage node may perform any or all of the following operations: replication (e.g., locally within the storage node), coalescing of redo logs to generate data pages, log management (e.g., manipulating log records), crash recovery (e.g., determining candidate log records for volume recovery), creating snapshots of segments stored at the storage node, and space management (e.g., for a segment or state storage). In some embodiments, each storage node 116 has one or more attached storage devices (e.g., SSDs, HDDs, or other persistent storage devices) on which data blocks may be stored on behalf of clients.

In some embodiments, each of the storage nodes 116 implements processes running on the node that manage communication with one or more database node 114, for example, to receive redo logs 132, send back data pages, etc. In some embodiments, data blocks written to the storage system may be backed up to long-term or archival storage (e.g., in a remote key-value durable backup storage system).

In some embodiments, a storage service 112 implements a storage service control plane that performs various storage system management functions. For example, a storage service control plane may implement a volume manager, which may maintain mapping information or other metadata for a database volume 134, such as current volume state, current writer, truncation tables, or other truncation information, or any other information for a volume as it is persisted in varying extents, segments, and protection groups. In some embodiments, the volume manager communicates with a client-side driver 130 to "mount" or "open" the volume for the client, providing the client-side driver 130 with mapping information, protection group policies, and various other information used to send write and read requests to storage nodes 116. The volume manager may provide the maintained information to storage clients, such as a database node 114 or client-side driver 130 or to other system components such as a backup agent. For example, the volume manager may provide a current volume state (e.g., clean, dirty, or recovery), current epoch or other version indicator for the volume, or any other information about a data volume.

In FIG. 1, the numbered circles "1"-"7" illustrate a process that includes a database node 114 processing database traffic 136 and that further includes a database node 114 processing a backtrack request 138. In some embodiments, users of the relational database service 110 may submit queries and other requests associated with a particular database instance in a number of ways, e.g., interactively via an SQL interface to the database system. In other embodiments, external applications and programs may submit queries using Open Database Connectivity (ODBC) or Java Database Connectivity (JDBC) driver interfaces to the database system.

In some embodiments, at circle "1" in FIG. 1, database traffic 136 is received and processed by the database instance, where the traffic includes operations that modify the content of the database. In some embodiments, the clients of the database instance can include any type of client configurable to submit requests to network-based services via a network, including requests for database services (e.g., a request to create a copy of a database, etc.). For example, a given client may include a suitable version of a web browser or may include a plug-in module or other type of code module that can execute as an extension to or within an execution environment provided by a web browser. Alternatively, a client can include a database application, a media application, an office application, or any other application that makes use of persistent storage resources to store and access one or more databases. In some embodiments, such an application includes sufficient protocol support (e.g., for a suitable version of HTTP) for generating and processing network-based services requests without necessarily implementing full browser support for all types of network-based data. That is, client may be an application that can interact directly with the cloud provider network 100. In some embodiments, clients may generate network-based services requests according to a Representational State Transfer (REST)-style network-based services architecture, a document- or message-based network-based services architecture, or another suitable network-based services architecture.

In some embodiments, the database traffic 136 is generated by a client application that provides access to storage of databases or other applications in a manner that is transparent to those applications. For example, the client application may integrate with an operating system or file system to provide storage in accordance with a suitable variant of the storage models described herein. However, the operating system or file system may present a different storage interface to applications, such as a conventional file system hierarchy of files, directories, or folders. In such an embodiment, applications may not need to be modified to make sure of the storage system service model. Instead, the details of interfacing to the cloud provider network 100 may be coordinated by the client application and the operating system or file system on behalf of applications executing within the operating system environment. In some embodiments, the client application generating database traffic 136 send network-based services requests (e.g., a request to create a copy of a database, queries to a database, etc.) to and receive responses from the cloud provider network 100 via one or more intermediate networks 106.

In some embodiments, a cloud provider network 100 implements various user management features. For example, the cloud provider network 100 may coordinate the metering and accounting of client usage of network-based services, including storage resources, such as by tracking the identities of requesting clients, the number or frequency of client requests, the size of data tables stored or retrieved on behalf of the clients, overall storage bandwidth used by clients, class of storage requested by clients, or any other measurable client usage parameter. In some embodiments, a cloud provider network 100 also implements financial accounting and billing systems or may maintain a database of usage data that may be queried and processed by external systems for reporting and billing of client usage activity. In some embodiments, the cloud provider network 100 collects, monitors, or aggregates a variety of storage service system operational metrics such as metrics reflecting the rates and types of requests received from clients, bandwidth utilized by such requests, system processing latency for requests, system component utilization, rates and types of errors resulting from requests, characteristics of storage and requested data pages or records thereof (e.g., size, data type, etc.) or any other suitable metrics. In some embodiments, such metrics may be used by system administrators to tune and maintain system components, while in other embodiments such metrics may be exposed to users to enable such users to monitor their usage of the relational database service 110 and other services.

In some embodiments, a cloud provider network 100 also implements user authentication and access control procedures. For example, for a given network-based services request to access a particular database instance, the cloud provider network 100 may ascertain whether the requesting client associated with the request is authorized to access the particular database instance. The cloud provider network 100 may determine such authorization by, for example, evaluating an identity, password, or other credential against credentials associated with the particular database, or by evaluating the requested access to the particular database against an access control list of the particular database, in some embodiments. For example, if a client does not have sufficient credentials to access a particular database, the cloud provider network 100 may reject the corresponding request, for example, by returning a response to the client indicating an error condition.

When a traditional database modifies a data page (e.g., in response to a write operation), it generates a redo log record and invokes a log applicator that applies the redo log record to the in-memory before-image of the page to produce its after-image. Transaction commit requires the log to be written, but the data page write may be deferred. As described herein, in some embodiments of the relational database service 110, the only writes that cross the network are redo log records (e.g., log records 132). As shown in FIG. 1, at circle "2," a database engine 118 processing a write sends redo log records 132 to the storage service 112. In some embodiments, the log applicator functionality is implemented at the storage tier where it can be used to generate database pages in the background or on demand. Generating each page from the complete chain of its modifications from the beginning of time may be prohibitively expensive and, thus, in some embodiments, each storage node 116 continually materializes database pages in the background to avoid regenerating them from scratch on demand each time. The storage nodes use the redo log records (e.g., redo logs 126 associated with segment 122A) to apply changes to their buffer caches. The database engine awaits quorum from the storage nodes to satisfy the write quorum and to consider the log records in question durable or hardened.

As indicated above, database query requests of database traffic 136 typically include requests to write to various data pages of a database instance. These requests are parsed and optimized to generate one or more write record requests, which may be sent to the client-side driver 130 for subsequent routing to the storage system. In this example, the client-side driver 130 generates one or more redo log records 132 corresponding to each write record request, and sends them to specific ones of the storage nodes 116 of specific protection groups 128 storing the partition user data of user data space to which the write record request pertains. In some embodiments, storage nodes 116 perform various peer-to-peer communications to replicate redo log records received at a storage node to other storage nodes that may not have received the redo log records. In some embodiments, the client-side driver 130 generates metadata for each of the redo log records that includes an indication of a previous log sequence number of a log record maintained at the specific protection group.

In some embodiments, each log record 132 is associated with a log sequence number (LSN) that is a monotonically increasing value generated by the database. In some embodiments, a database node 114 continuously interacts with the storage service 112 and maintains state to establish quorum, advance volume durability, and register transactions as committed. As the database receives acknowledgements to establish the write quorum for each batch of log records, it advances the current volume durable LSN (VDL). As noted, a data volume may consist of multiple extents, each represented by a protection group consisting of one or more segments. In some embodiments, log records 132 directed to different extents may have interleaved LSNs. For changes to the volume to be durable up to a particular LSN, it may be necessary for all log records up to that LSN to be durable, regardless of the extent to which they belong. In some embodiments, the client-side driver 130 keeps track of outstanding log records that have not yet been made durable, and once all log records up to a specific LSN are made durable, it may send a volume durable LSN (VDL) message to one of the protection groups in the volume. The VDL may then be written to all synchronous mirror segments for the protection group.

Figure 2:
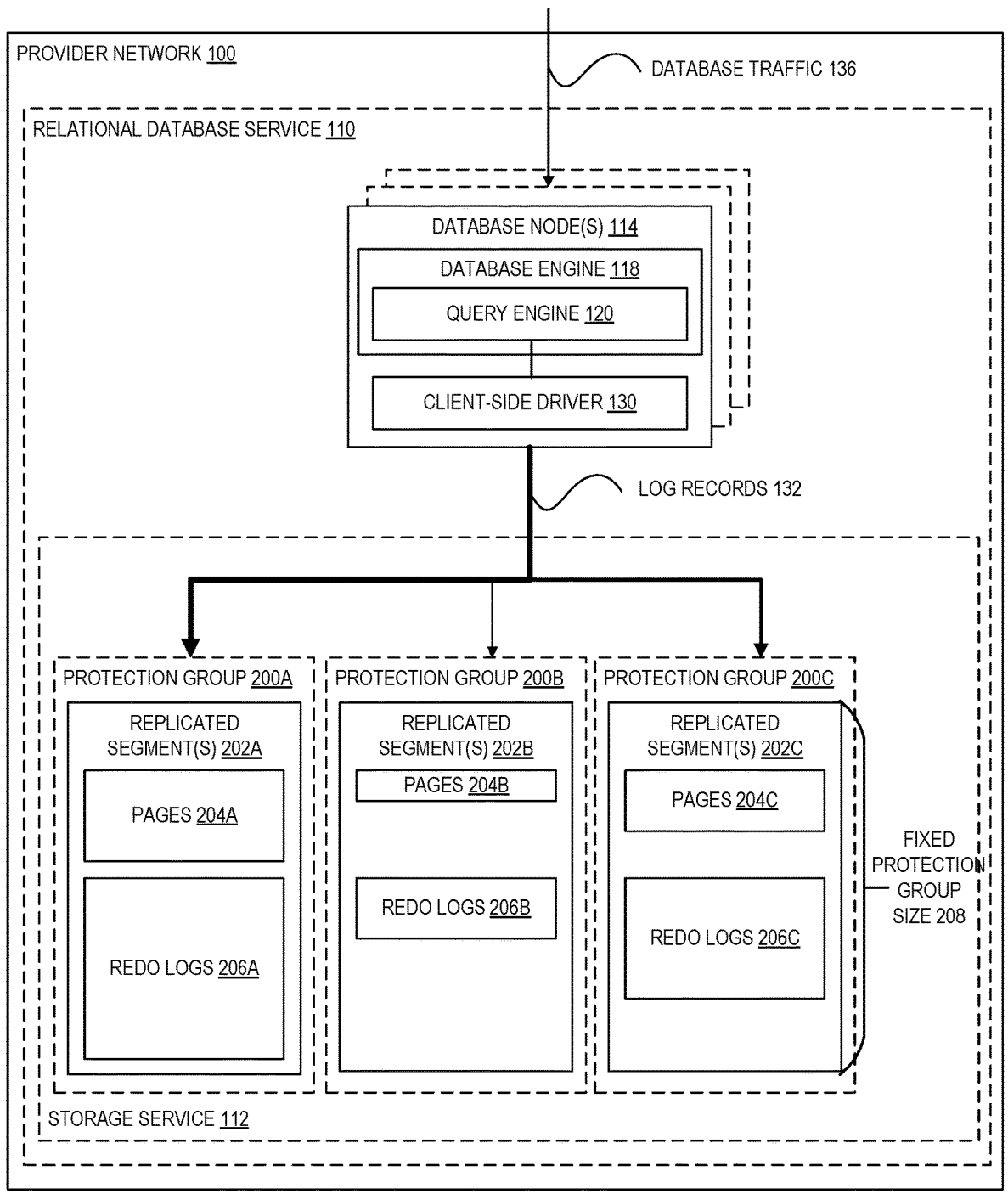
FIG. 2 is a diagram illustrating a distribution of a database workload across a set of protection groups constituting a database volume according to some embodiments.

FIG. 2 illustrates a distribution of a database workload among a plurality of protection groups forming a database volume. As represented by the varying thickness of the illustrated lines connecting the database node 114 to the protection groups 200A-200C, a typical database workload may not be evenly distributed to all pages of the database (e.g., because the nature of various types of database applications may involve writing to certain parts of a database more than others). This means that some protection groups forming a database volume are destined to reach the protection group size limit 208 before others (e.g., the replicated segment(s) 202A, including pages 204A and redo logs 206A, approach the protection group size limit ahead of protection groups 200B and 200C, which are associated with lighter traffic).

Figure 3:
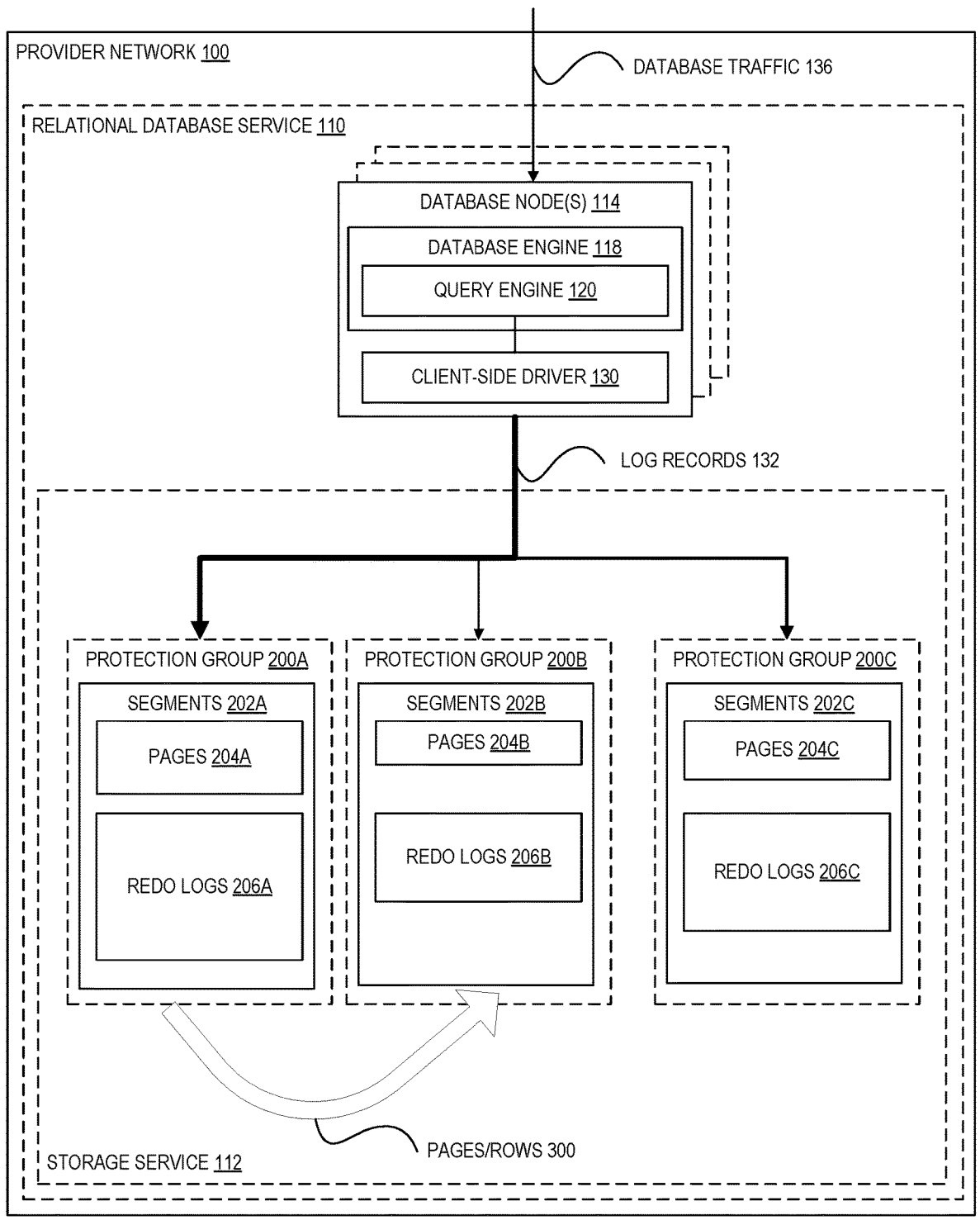
FIG. 3 is a diagram illustrating the redistribution of data pages, data rows, or other data elements, among the protection groups constituting a database volume for a workload that is unevenly distributed across the protection groups according to some embodiments.

In some embodiments, in order to help prevent protection groups from exceeding a fixed protection group size limit, a relational database service 110 attempts to balance the traffic of protection groups by moving database rows or pages from more active protection group to less active protection groups. FIG. 3 illustrates the movement of pages, rows, or other data elements from a more active protection group to one or more lesser active protection groups. As shown, the protection group 200A is more active than protection groups 200B and 200C and, thus, the combined size of the associated pages 204A and redo logs 206A is approaching a protection group size limit. In one embodiment, in response to detecting an imbalance in the activity of various protection groups, a client-side driver 130 or other component causes some number of rows or pages 300 associated with the protection group 200A to be moved to one or more other protection groups (e.g., to be stored as part of the pages 204B of segment(s) 202B or pages 204C of segment(s) 202C).

In some embodiments, a database instance balances the records or pages of a database as described above using an index of the pages (e.g., a B-tree index, heap index, etc.) and a known mapping between pages in the index and particular protection groups. For example, a database instance desiring to move database records or pages from a first protection group to a second protection group (e.g., from a more active protection group to a lesser active one) can move nodes representing those records or pages from a location in the index corresponding to the first protection group to a location corresponding to the second protection group. The movement of such records or pages in the index thereby further results in the movement of the records or pages to different physical storage locations to which the respective protection groups are mapped. thereby resulting in a different balancing of a corresponding physical storage of the pages. While the movement of pages or rows among protection groups can help reduce an amount of time before any given protection group exceeds the protection group size limit, ultimately, a sufficiently active database includes at least one protection group that approaches the size limit regardless of the amount of rebalancing.

According to some embodiments, additionally or alternatively to rebalancing rows or pages among protection groups, a relational database service enables the creation and storage of "versioned" protection groups that enable a database to store an unlimited amount of redo log data for a database. Returning to FIG. 1, in some embodiments, at circle "3," a storage node 116 sends a message to the client-side driver 130 indicating that a protection group (e.g., one of protection groups 128A-128N) is approaching the fixed size data limit of a protection group (e.g., the size of the data pages and redo logs stored as part of a protection group is approaching the fixed data limit size). For example, a storage node 116 may generate such a message in response to detecting that the size of a protection group is above a defined threshold (e.g., above 95% of the fixed sized data limit, or any other threshold).

In some embodiments, in response to receiving the message from a storage node, at circle "4," the client-side driver 130 generates and sends a request to a volume manager to create a new version of the protection group approaching the fixed protection group size at a VDL (e.g., at the current VDL). As described in more detail below, the new version of the identified protection group is assigned a new version number to distinguish it from copies of the protection group associated with older LSNs and, once a copy of the identified protection group is created, the client side driver begins writing to the most current copy of the protection group and the older version of the protection group is made to be read only.

Figure 4:
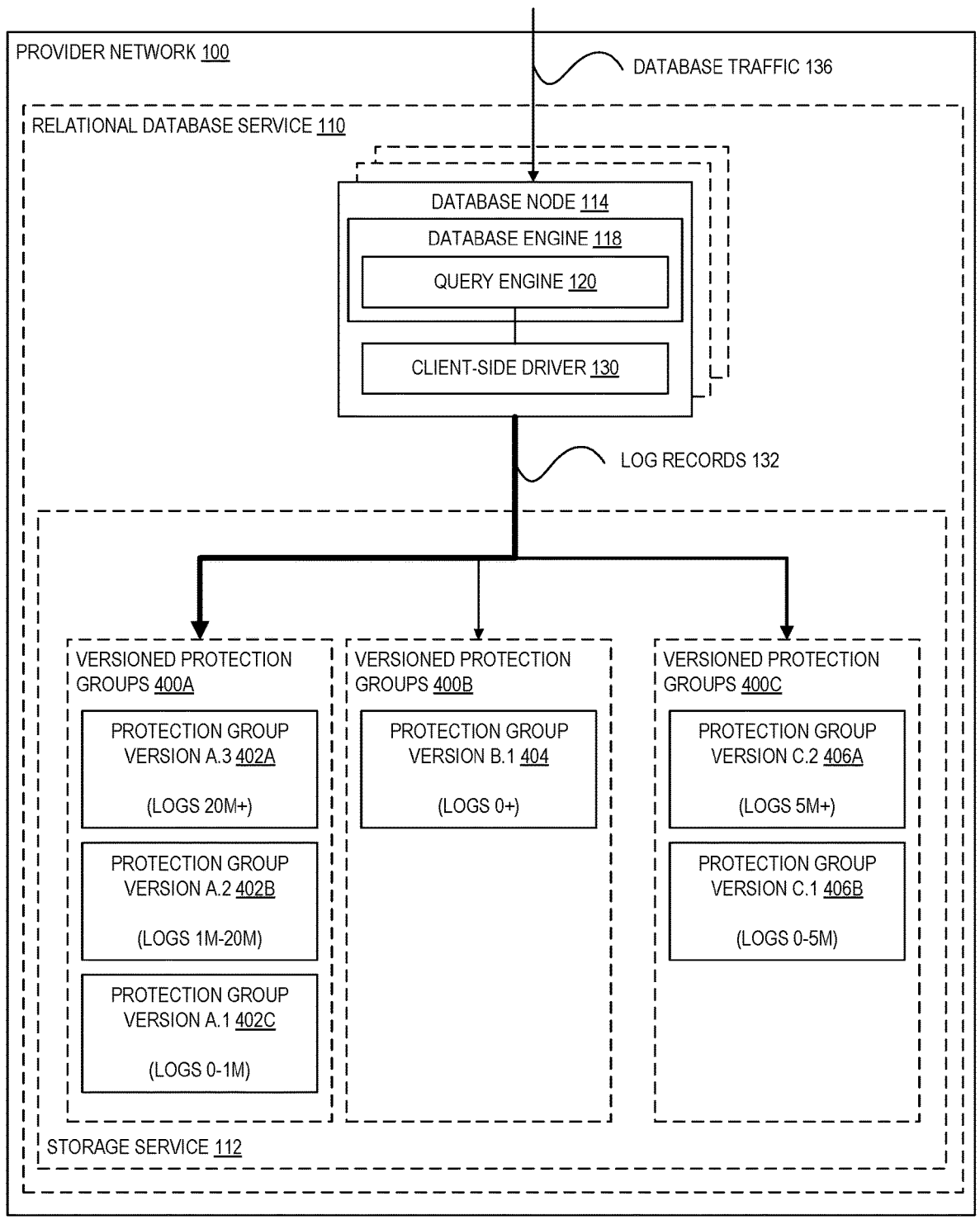
FIG. 4 is a diagram illustrating the creation of versioned protection groups responsive to protection groups approaching a maximum size limit according to some embodiments.

FIG. 4 illustrates the creation of versioned protection groups, each including one or more separate protection groups associated with a distinct version number used to distinguish it from other versions of the same protection group. For example, as illustrated in FIG. 4, the versioned protection groups 400A-400C each include one or more copies of a protection group, or "incarnations," depending on a number of times that the size of the protection group (e.g., based on the stored redo log data and other backtrack data) reaches the protection group size limit. In this example, the versioned protection group 400A includes three separate versions of a same protection group: a current protection group version A.3 402A, which is the active version of the protection group and storing data associated with the LSN range 20M+, an older version of the protection group A.2 402B, which stores page data and backtrack data associated with the LSN range 1M-20M, and an older version of the protection group A.1 402A, which stores page data and backtrack data associated with the LSN range 0-1M. The log record range associated with each protection group version may be different depending on how active a given protection group is during any given time period. In the example of FIG. 4, versioned protection groups 400B currently includes only a single protection group version B.1 404, for example, because the protection group has been relatively inactive during the history of the database and has not accumulated redo logs and other data causing the protection group to exceed the size limit. Similarly, versioned protection groups 400C includes a current protection group version C.2 406A and an older protection group version C.1 406B. Although the example in FIG. 4 illustrates three separate versioned protection groups, in general, a database volume may be comprised of any number of versioned protection groups depending on the amount of data stored in the database volume.

To illustrate the creation of a protection group version, returning to FIG. 1 at circle "5," in some embodiments, a volume manager of the storage service 112 creates a workflow used to clone the identified protection group that is approaching the protection group size limit at the desired VDL. In some embodiments, the volume manager also sends a request to the client-side driver 130 to issue a reserve read image on the protection group at the desired VDL. In some embodiments, the clone workflow contacts the storage node 116 to perform shallow clones for the segments associated with the identified protection group, for example, so that a new versioned copy of the protection group is created.

In some embodiments, the volume manager also creates or updates a protection group table or index describing the geometry of the database volume (e.g., including data identifying each of the versioned protection groups, identifying a storage location of each protection group version, and identifying a range of log records associated with protection group version). In some embodiments, once the protection group cloning process is complete, the client-side driver 130 starts writing to the new incarnation of the protection group. It is noted that the set of storage nodes upon which a protection group is stored may change over time, for example, as storage nodes experience various types of failures, are taken offline for updates, are rebalanced for heat management purposes, or for a variety of other reasons. Thus, in some embodiments, a volume manager may update the protection group table or index over time to reflect a current set of storage nodes upon which each protection group is stored.

Figure 5:
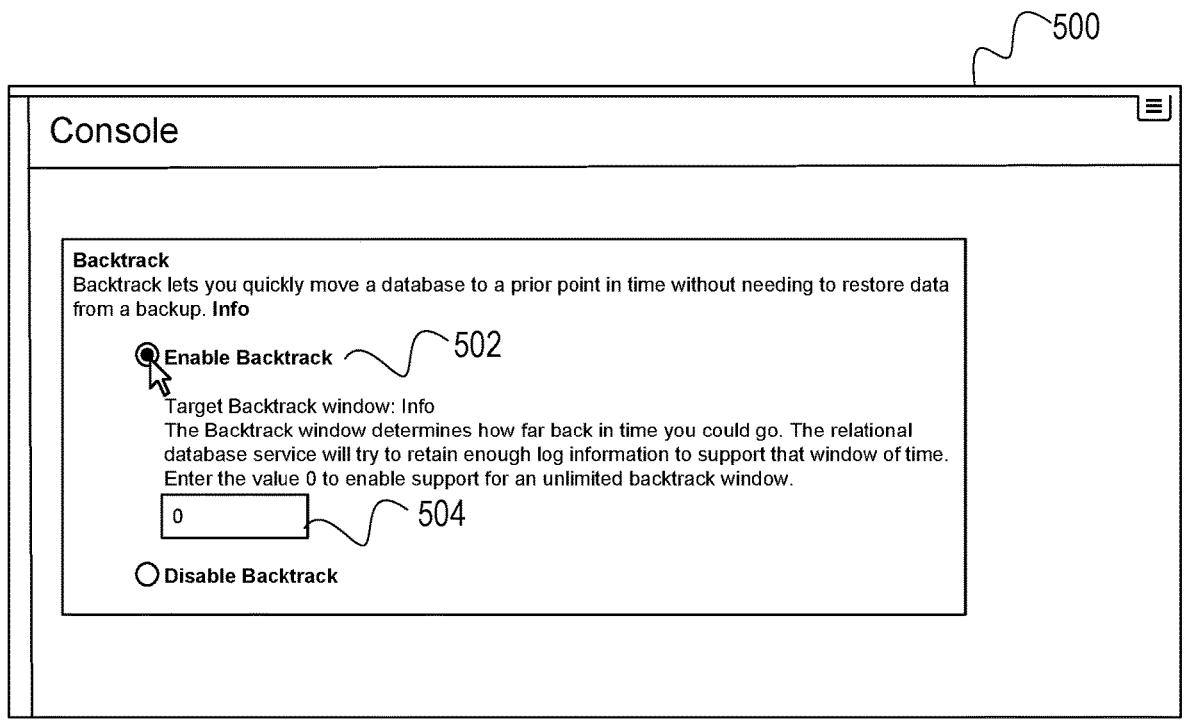
FIG. 5 illustrates an example graphical user interface (GUI) illustrating the configuration of backtrack settings for a database managed by a relational database service according to some embodiments.

As indicated above, users can configure the ability to backtrack a database instance for either a limited or unlimited period of time. FIG. 5 illustrates an example GUI 500 that a user can use to enable the ability to backtrack and to specify a backtrack window. As shown, the GUI 500 includes an interface element 502 that enables a user to request enabling backtrack for a particular database instance, and further includes an interface element 504 that can be used to specify a backtrack duration (e.g., 72 hours, or unlimited). The longer the backtrack duration, the more redo logs and other backtrack data will be retained by the database instance, where an unlimited backtrack duration, for example, involves storing all or substantially all of the redo logs for a database instance using versioned protection groups as described herein.

In some embodiments, a user can configure the storage of backtrack data across a set of hierarchical or tiered storage resources (e.g., across a set of storage resources that range from higher-performance, higher-cost storage media to lower-performance, lower-cost storage). For example, a user may desire the option to perform online restore operations covering the entire lifespan of the database and, in particular, to be able to quickly restore within the most recent week at any given time. In this example, the relational database service 110 stores the backtrack data of the current protection groups and older versioned protection groups associated with the past week in "hot" storage (e.g., directly on the storage nodes alongside the current incarnations of the protection groups) and incrementally move older protection group versions to "colder" storage as needed. In general, users can configure the association of any ranges of time with various tiers of storage resources provided by the relational database service 110. In this manner, users can balance a desired speed of restoring database instances to particular points in time with a cost of maintaining an ever-growing set of backtrack data.

Figure 6:
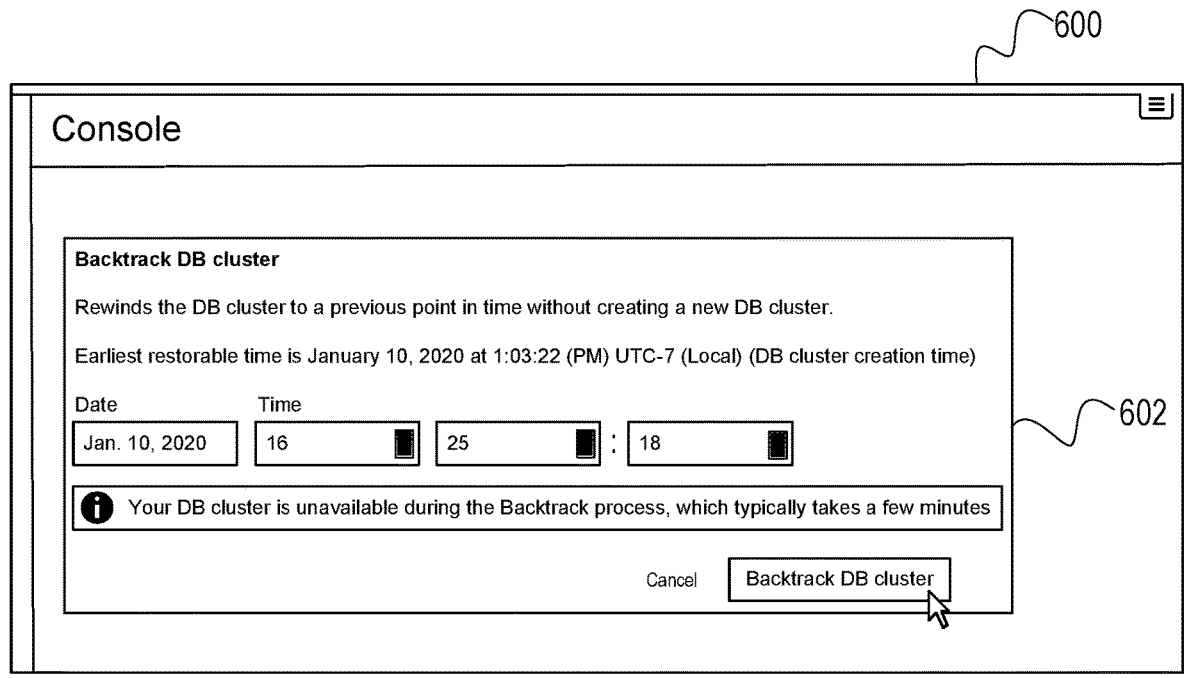
FIG. 6 illustrates an example GUI that enables users to initiate a backtrack operation for a database managed by a relational database service according to some embodiments.

Returning to FIG. 1, at circle "7," a request to backtrack to a point in time of the database is received. FIG. 6 illustrates an example GUI 600 for specifying a point in time to rewind or backtrack a database instance. As shown, the interface elements 602 include various components that enable a user to specify a particular point in time (e.g., a date and time) to which the user desires to backtrack the database. In some embodiments, the GUI may enable the user to specify only dates and times that are within the configured backtrack window the associated database instance.

Figure 7:
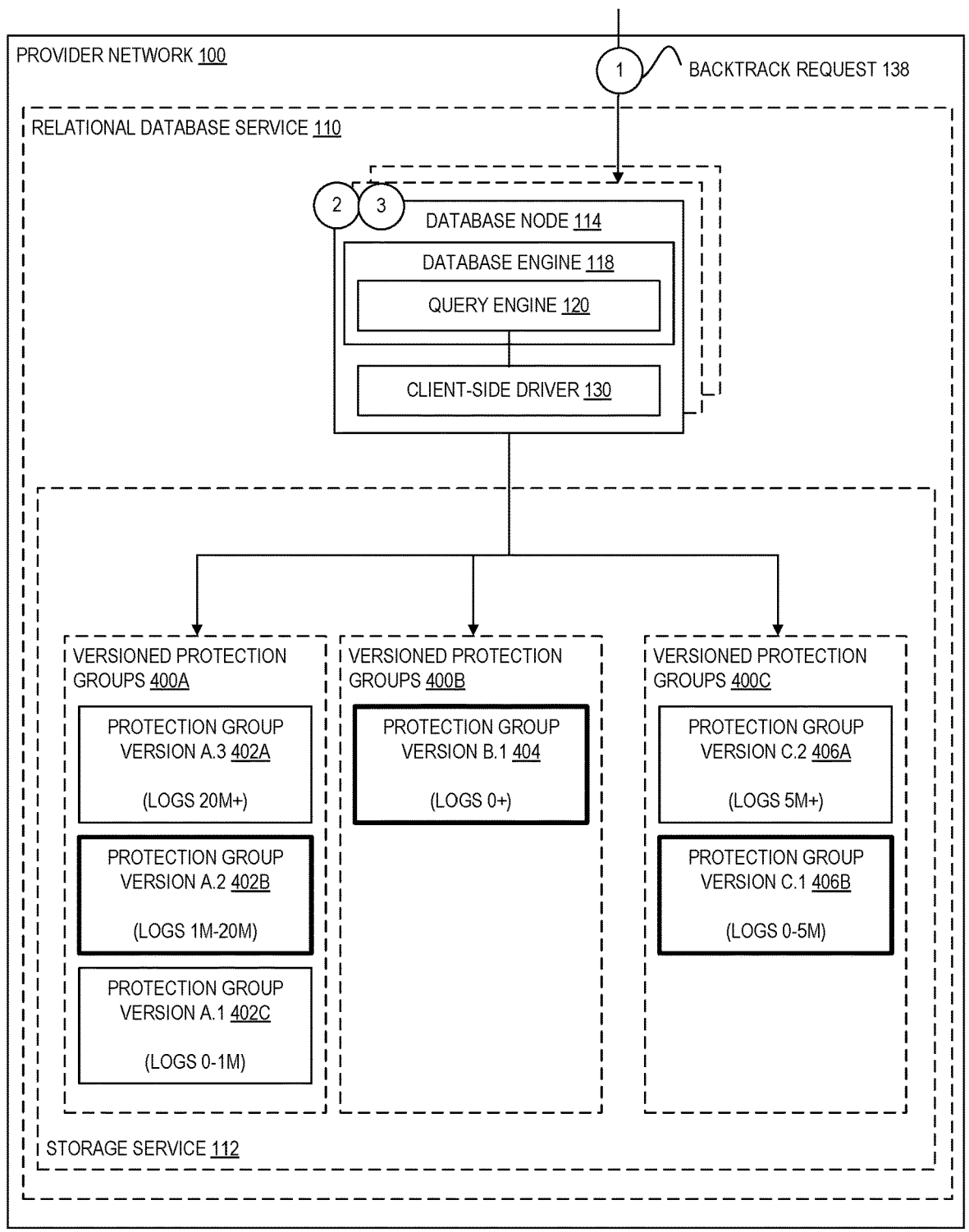
FIG. 7 is a diagram illustrating the identification of a set of versioned protection groups used to satisfy a backtrack request according to some embodiments.

FIG. 7 illustrates a process for processing a request to backtrack to a particular point in time. At circle "1," a request is received to backtrack to a particular point in time. In some embodiments, online restore may be facilitated by storage of snapshots, redo logs, and so on, for different prior states of the database as part of the data store for the database, as described herein. In some embodiments, a change log may also be maintained describing the changes applied to the database (e.g., as log records), including changes to be made between the different snapshots. In some embodiments, at circle "2," the database node 114 converts the requested point in time to a log sequence number that is associated with the point in time in the past. As described in more detail hereinafter, in some embodiments, at circle "3" the database node 114 then locates protection group checkpoints (e.g., data page snapshots) closest before the requested point in time and causes redo logs to be applied after that checkpoint up to user requested point in time, and other state information associated with the database node 114 may be restored to the requested point in time, thereby restoring the database to the requested point. In the example of FIG. 7, the point in time indicated in the backtrack request 138 is converted to a log sequence number somewhere between 1M and 5M and thus protection groups 402B, 404, and 406B are identified as containing backtrack data associated with the specified point in time (e.g., because the protection groups are associated with log sequence number ranges that include the identified log sequence number). In some embodiments, the identification of appropriate protection group versions includes using the protection group index described above, which identifies a geometry of the database instance (e.g., an identification of the protection group, log sequence number ranges associated with the protection groups, a storage location of each protection group, etc.).

As indicated above, snapshots (or other data/contents that can represent the state of a database at a point in time) of different states of a database may be stored as part of a data store that stores data for the database and a log of changes to the database. For example, as discussed above, state storage may be allocated as part of database storage (e.g., different slots) which may allow for a number of snapshots to be stored for the different states. In some embodiments, the stored snapshots may determine the online restore window for the database. For example, an earliest snapshot may be the lower bound of the online restore window for the database (e.g., as of the sequence number associated with the earliest snapshot). According to embodiments described herein, if a user desires unlimited restore capabilities, the online restore window can be unlimited (that is, to the beginning of the database), where the snapshots and change records for the database may be stored across any number of versioned protection groups.

In some embodiments, a backtrack request 138 may be received via a network-based interface (e.g., formatted according to an API) that identifies a database and state selection or indication. State selection or indications of a previous state for a request to restore a database may include a point in time (e.g., a date and time), a sequence number, or an event (e.g., a previous request that performs an update to the database, such as a Data Definition Language (DDL) type of request or a Data Manipulation Language (DML) type of request). In at least some embodiments, the state selection or indication may be identifier of a state of the database that was previously provided in response to a request for recommended restore states for the database (e.g., that correspond to events such as DDL or DML events, power or other failure events, etc.).

In some embodiments, the request may be validated. For example, if the request indicates a previous state of the database for which online restore operations are not available (e.g., outside of an online restore window or range), the request may be denied. In some embodiments, the denial may provide indications of the online restore range or recommendations of restore states for the database.

If the request is valid, one or more log records that describe changes to be made to one of the stored snapshots of the database prior to the previous state indicated in the request may be applied to the one snapshot to generate new state information for a database engine 118. For example, a snapshot describing a state of the database that is before the previous state and closest to the previous state may be identified (e.g., by comparing a restore state sequence point determined based on the previous state (e.g., converting a timestamp to a sequence number) and the log record(s) describing changes to be made up to the previous state may be identified (by identifying log records with sequence values less than or equal to the restore point sequence number). The log records may generate new state information that includes data dictionaries, undo logs, transaction logs/tables, indexing structures, mapping information, data page caches or buffers, or any other information used to perform access requests with respect to the database. As indicated, current state information in the database engine 118 may be replaced with the new state information, in some embodiments. For example, memory locations that store the state information may be overwritten with the new state information.

In some embodiments, an exclusion range in the log may be identified as part of the online restore operation that excludes log records describing changes to be made after the previous state. For example, truncation mapping or other state information may be updated to identify a range of sequence number values that should not be viewed, applied, or otherwise used to process access requests to the database. Note that these log records may not be deleted from the log. As discussed above, the requests to restore the database may be performed multiple times both forward and backward within the online restore range. Thus, the identification and update of exclusion ranges may include changing a previously identified exclusion range to include log records that were previously identified as excluded prior to the request received. As exclusion range values may change so that some log records are included or excluded from the log, exclusion range values may track an order or history or restore operations in some embodiments so as to determine which sequence numbers occurred after each restore operation.

In some embodiments, state information of a query engine is updated based, at least in part, on contents of the database stored prior to the previous state and one or more log records describing changes to be made to the contents of the database stored prior to the previous state. State information may include data dictionaries, undo logs, transaction logs/tables, indexing structures, mapping information, data page caches or buffers, or any other information used to perform access requests with respect to the database. At least some of the state information may be obtained from the data store by applying log records to prior contents (e.g., a snapshot of the database or a portion thereof). For instance, a snapshot describing a state of the database that is before the previous state and closest to the previous state may be identified (e.g., by comparing a restore state sequence point determined based on the previous state (e.g., converting a timestamp to a sequence number) and the log record(s) describing changes to be made up to the previous state may be identified (by identifying log records with sequence values less than or equal to the restore point sequence number). The snapshots may include data pages, blocks, structures, or other state information that may be included as part of the update to the state information of the query engine. For example, data dictionary information (e.g., pages) describing the structure or schema of the database (e.g., number of columns, column names, column data types, etc.) may be stored in a snapshot. The log records to be applied may include (or may not include) changes to the data dictionary information which can be applied to generate the data dictionary information of the database as of the previous state to which the database is being restored. Thus, the generated data dictionary from the snapshot may be included in the update to the state information of the query engine. Other state information changes, such as changes to the data page cache, may be performed separate from contents of the data store. Once updated, the query engine is available for processing access requests to the database as of the restored state.

Figure 8:
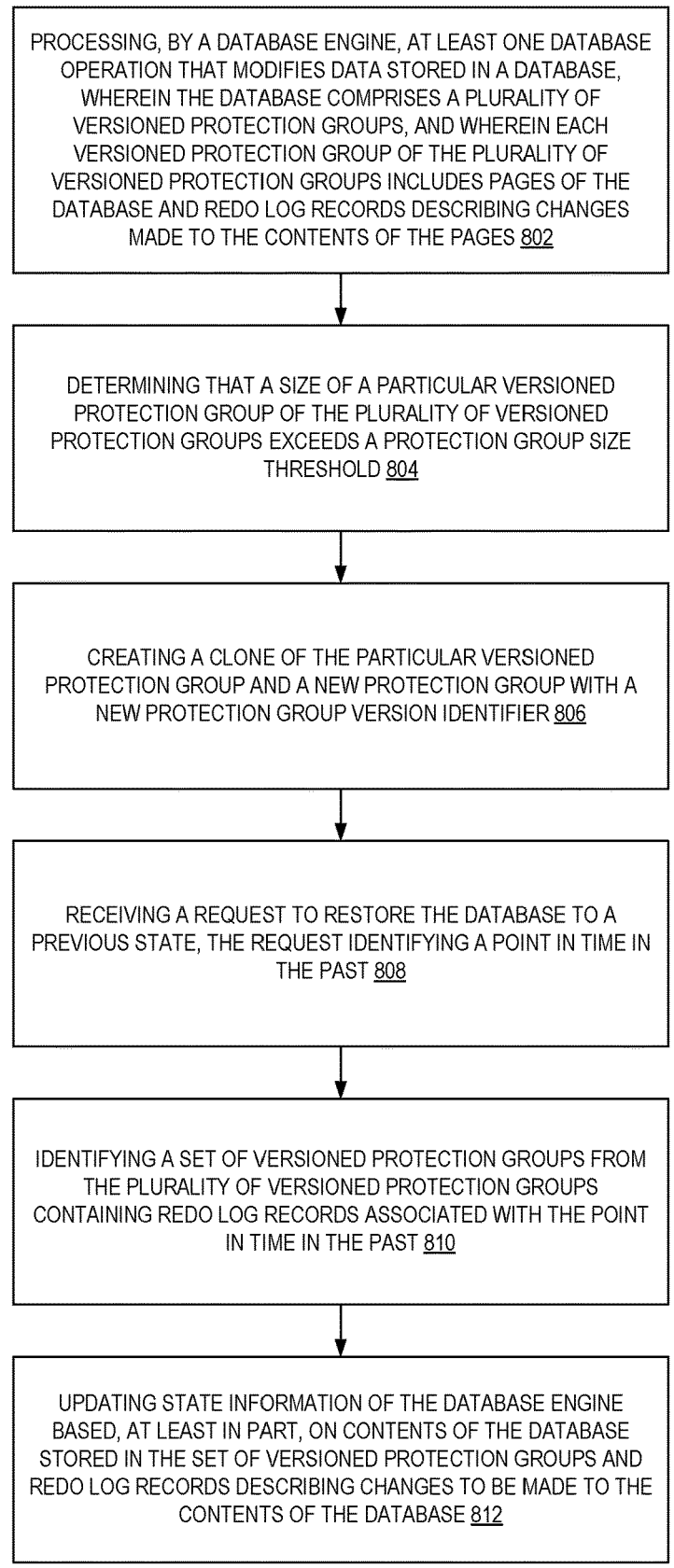
FIG. 8 is a flow diagram illustrating operations of a method for creating versioned protection groups during operation of a database and using the versioned protection groups to satisfy backtrack requests according to some embodiments.

FIG. 8 is a flow diagram illustrating operations 800 of a method enabling a relational database service of a cloud provider network to provide online restore or "backtrack" capabilities that are unlimited in terms of an amount of time in the past to which a database can be restored according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by a database node, storage node, and other components of the other figures.

The operations 800 include, at block 802, processing, by a database engine, at least one database operation that modifies data stored in a database, wherein the database comprises a plurality of versioned protection groups, and wherein each versioned protection group of the plurality of versioned protection groups includes pages of the database and redo log records describing changes made to the contents of the pages.

In some embodiments, the pages and redo log records of a versioned protection group are replicated at a plurality of storage nodes managed by a distributed storage system that is separate from the database engine. In some embodiments, a versioned protection group of the plurality of versioned protection groups is associated with a range of redo log record identifiers and includes at least one page snapshot and at least one redo log record associated with an identifier within the range of redo log record identifiers.

The operations 800 further include, at block 804, determining that a size of a particular versioned protection group of the plurality of versioned protection groups exceeds a protection group size threshold.

The operations 800 further include, at block 806, creating a clone of the particular versioned protection group and a new protection group with a new protection group version identifier.

In some embodiments, the operations further include identifying a particular versioned protection group that exceeds a protection group size threshold; and moving rows associated with the particular versioned protection group to another versioned protection group of the database.

In some embodiments, the operations further include storing, in a protection group index, for each versioned protection group: an identifier of the versioned protection group, an identifier of a storage node at which the versioned protection group is stored, and a range of log record identifiers associated with the versioned protection group; identifying a log sequence number associated with the point in time in the past; and wherein identifying the set of versioned protection groups from the plurality of versioned protection groups includes using the protection group index to identify versioned protection groups associated with a range of log record identifiers including the log sequence number.

The operations 800 further include, at block 808, receiving a request to restore the database to a previous state, the request identifying a point in time in the past. In some embodiments, the request to restore the database to the previous state specifies a date and time to which the database is to be restored, and wherein the date and time is converted to a log sequence identifier associated with the date and time. In some embodiments, the operations further include receiving, via a graphical user interface (GUI), a request to restore the database to the previous state, wherein the GUI includes interface elements used to specify a date and time at which to restore the database.

The operations 800 further include, at block 810, identifying a set of versioned protection groups from the plurality of versioned protection groups containing redo log records associated with the point in time in the past. In some embodiments, the operations further include identifying an exclusion range of log record identifiers that are subsequent to the point in time in the past.

The operations 800 further include, at block 812, updating state information of the database engine based, at least in part, on contents of the database stored in the set of versioned protection groups and redo log records describing changes to be made to the contents of the database. In some embodiments, updating the state information includes updating at least one of: a data dictionary, a transaction log, a transaction table, an indexing structure, or a data page cache. In some embodiments, a versioned protection group of the plurality of versioned protection groups includes a plurality of snapshots of data pages associated with the versioned protection group, and wherein updating the state information includes applying the redo log records to one of the plurality of snapshots of the data pages.

In some embodiments, the operations further include receiving input specifying a range of time, wherein a first set of versioned protection groups containing redo logs associated with the range of time are to be stored in a first tier of a tiered set of storage resources; and storing a second set of versioned protection groups containing redo logs outside of the range of time in a second tier of the tiered set of storage resources.

Figure 9:
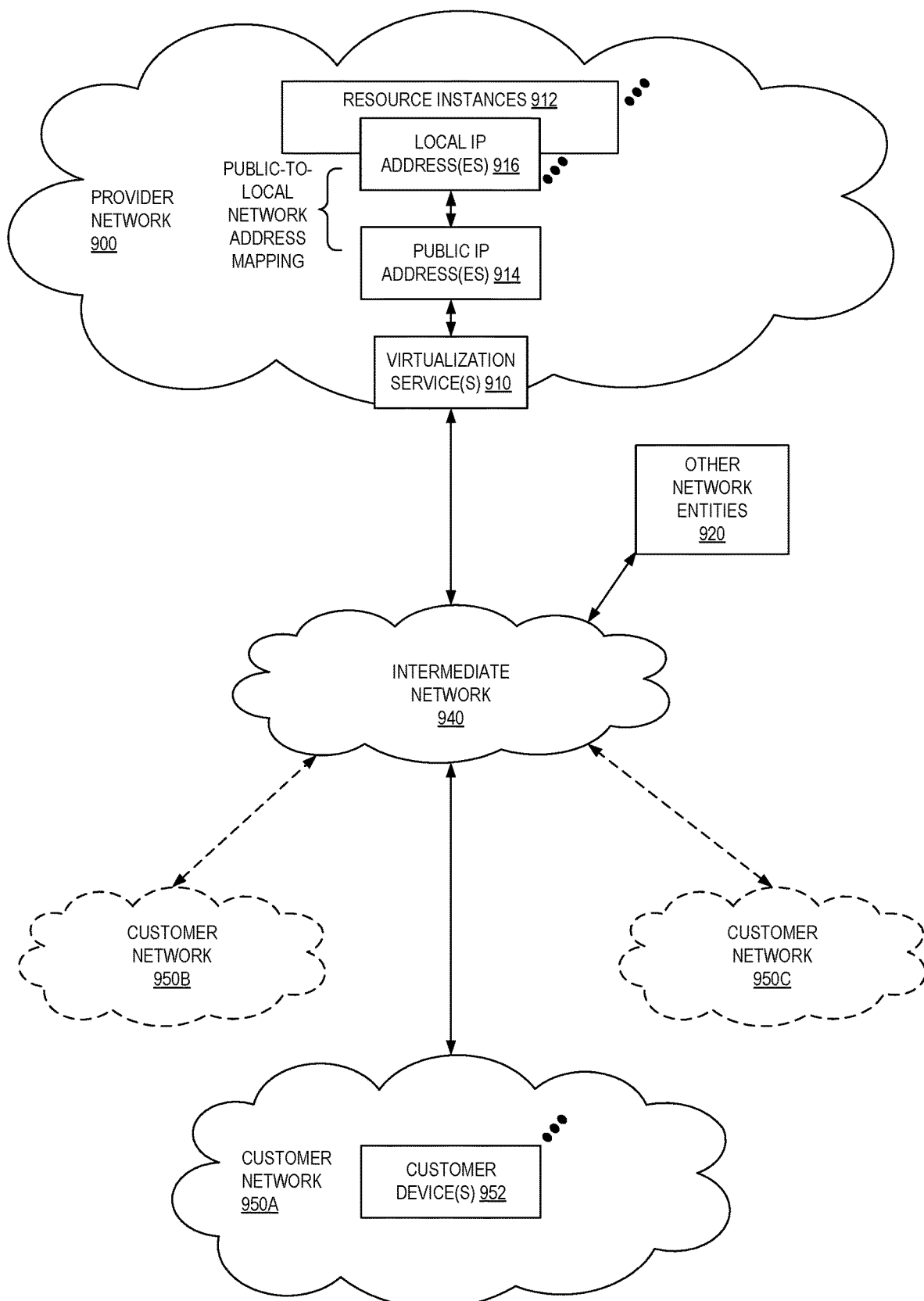
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
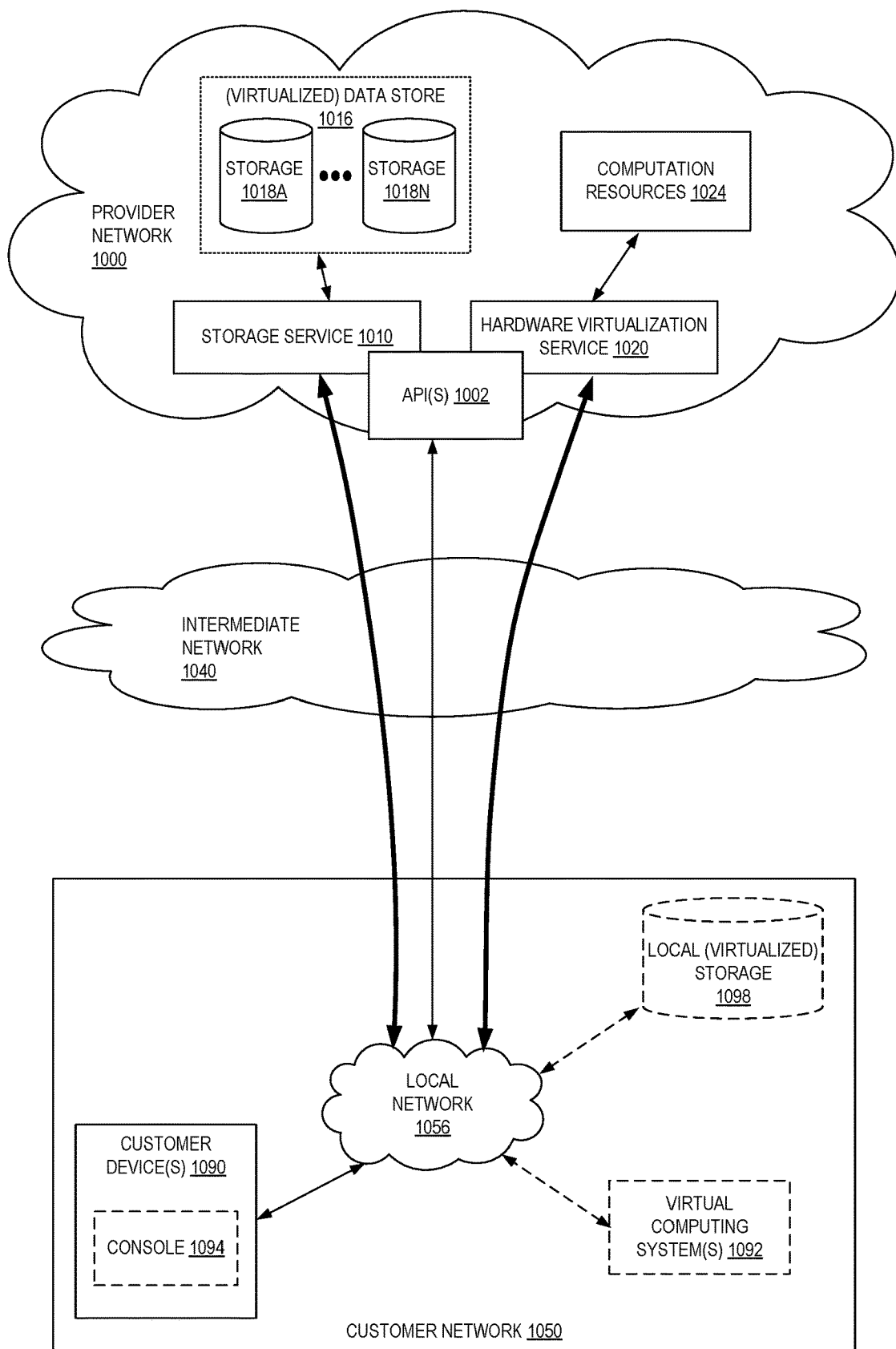
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Figure 11:
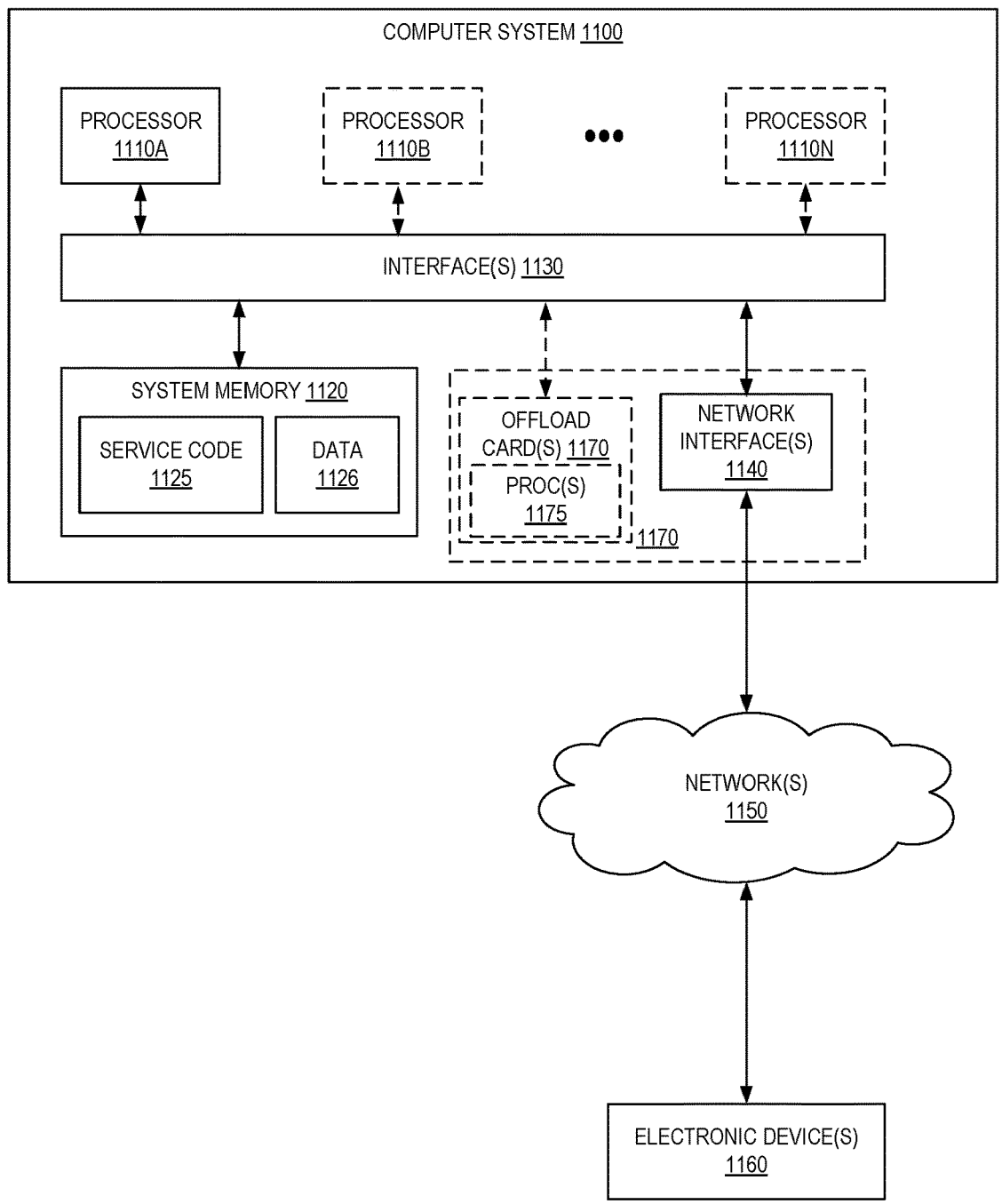
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as service code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   processing, by a database engine, at least one database operation that modifies data stored in a database, wherein the database comprises a plurality of versioned protection groups, and wherein each versioned protection group of the plurality of versioned protection groups includes pages of the database and redo log records describing changes made to contents of the pages;
   determining that a size of a particular versioned protection group of the plurality of versioned protection groups exceeds a protection group size threshold;
   creating a clone of the particular versioned protection group and a new protection group with a new protection group version identifier;
   receiving a request to restore the database to a previous state, the request identifying a point in time in the past;

identifying a set of versioned protection groups from the plurality of versioned protection groups containing redo log records associated with the point in time in the past; and updating state information of the database engine based, at least in part, on contents of the database stored in the set of versioned protection groups and redo log records describing changes to be made to the contents of the database.

2. The computer-implemented method of claim 1, further comprising:

storing, in a protection group index, for each versioned protection group: an identifier of the versioned protection group, an identifier of a storage node at which the versioned protection group is stored, and a range of log record identifiers associated with the versioned protection group;

identifying a log sequence number associated with the point in time in the past; and wherein identifying the set of versioned protection groups from the plurality of versioned protection groups includes using the protection group index to identify versioned protection groups associated with a range of log record identifiers including the log sequence number.

3. The computer-implemented method of claim 1, wherein the pages and redo log records of a versioned protection group are replicated at a plurality of storage nodes managed by a distributed storage system that is separate from the database engine.

4. A computer-implemented method comprising:

receiving, by a database engine, a request to restore a database to a previous state, wherein the database comprises a plurality of versioned protection groups, and wherein each versioned protection group of the plurality of versioned protection groups includes pages of the database and redo log records describing changes made to contents of the pages;

identifying a set of versioned protection groups from the plurality of versioned protection groups containing redo log records associated with a point in time in the past; and updating state information of a database engine based, at least in part, on contents of the database stored in the set of versioned protection groups and redo log records describing changes to be made to the contents of the database.

5. The computer-implemented method of claim 4, further comprising:

processing, by the database engine, at least one database operation that modifies data stored in a database, wherein the database comprises a plurality of versioned protection groups, and wherein each versioned protection group of the plurality of versioned protection groups includes pages of the database and redo log records describing changes made to the contents of the pages;

determining that a size of a particular versioned protection group of the plurality of versioned protection groups exceeds a protection group size limit; and creating a clone of the particular versioned protection group and a new protection group with a new protection group version identifier.

6. The computer-implemented method of claim 4, further comprising:

storing, in a protection group index, for each versioned protection group: an identifier of the versioned protection group, an identifier of a storage node at which the versioned protection group is stored, and a range of log record identifiers associated with the versioned protection group;

identifying a log sequence number associated with the point in time in the past; and wherein identifying the set of versioned protection groups from the plurality of versioned protection groups includes using the protection group index to identify versioned protection groups associated with a range of log record identifiers including the log sequence number.

7. The computer-implemented method of claim 4, wherein the pages and redo log records of a versioned protection group are replicated at a plurality of storage nodes managed by a distributed storage system that is separate from the database engine.

8. The computer-implemented method of claim 4, wherein a versioned protection group of the plurality of versioned protection groups is associated with a range of redo log record identifiers and includes at least one page snapshot and at least one redo log record associated with an identifier within the range of redo log record identifiers.

9. The computer-implemented method of claim 4, wherein the request to restore the database to the previous state specifies a date and time to which the database is to be restored, and wherein the date and time is converted to a log sequence identifier associated with the date and time.

10. The computer-implemented method of claim 4, further comprising:

identifying a particular versioned protection group that exceeds a protection group size threshold; and moving rows associated with the particular versioned protection group to another versioned protection group of the database.

11. The computer-implemented method of claim 4, further comprising receiving, via a graphical user interface (GUI), a request to restore the database to the previous state, wherein the GUI includes interface elements used to specify a date and time at which to restore the database.

12. The computer-implemented method of claim 4, further comprising identifying an exclusion range of log record identifiers that are subsequent to the point in time in the past.

13. The computer-implemented method of claim 4, wherein updating the state information includes updating at least one of: a data dictionary, a transaction log, a transaction table, an indexing structure, or a data page cache.

14. The computer-implemented method of claim 4, wherein a versioned protection group of the plurality of versioned protection groups includes a plurality of snapshots of data pages associated with the versioned protection group, and wherein updating the state information includes applying the redo log records to one of the plurality of snapshots of the data pages.

15. The computer-implemented method of claim 4, further comprising:

receiving input specifying a range of time, wherein a first set of versioned protection groups containing redo logs associated with the range of time are to be stored in a first tier of a tiered set of storage resources; and storing a second set of versioned protection groups containing redo logs outside of the range of time in a second tier of the tiered set of storage resources.

16. A system comprising:

a first one or more electronic devices to implement a database node of a relational database service in a multi-tenant provider network, the database node including instructions that upon execution cause the database node to:

process at least one database operation that modifies data stored in a database, wherein the database comprises a plurality of versioned protection groups, and wherein each versioned protection group of the plurality of versioned protection groups includes pages of the database and redo log records describing changes made to contents of the pages;

receive a message indicating that a size of a particular versioned protection group of the plurality of versioned protection groups exceeds a protection group size threshold;

create a clone of the particular versioned protection group and a new protection group with a new protection group version identifier;

receive a request to restore the database to a previous state, the request identifying a point in time in the past;

identify a set of versioned protection groups from the plurality of versioned protection groups containing redo log records associated with the point in time in the past; and update state information of a database engine based, at least in part, on contents of the database stored in the set of versioned protection groups and redo log records describing changes to be made to the contents of the database; and a second one or more electronic devices to implement a storage node, the storage node including instructions that upon execution cause the storage node to:

determine that a size of a particular versioned protection group of the plurality of versioned protection groups exceeds a protection group size threshold; and send a message to the database node indicating that the size of the particular versioned protection group exceeds a protection group size threshold.

17. The system of claim 16, wherein the database node further includes instructions that upon execution cause the database node to:

store, in a protection group index, for each versioned protection group: an identifier of the versioned protection group, an identifier of a storage node at which the versioned protection group is stored, and a range of log record identifiers associated with the versioned protection group;

identify a log sequence number associated with the point in time in the past; and wherein identifying the set of versioned protection groups from the plurality of versioned protection groups includes using the protection group index to identify versioned protection groups associated with a range of log record identifiers including the log sequence number.

18. The system of claim 16, wherein the pages and redo log records of a versioned protection group are replicated at a plurality of storage nodes managed by a distributed storage system that is separate from the database engine.

19. The system of claim 16, wherein a versioned protection group of the plurality of versioned protection groups is associated with a range of redo log record identifiers and includes at least one page snapshot and at least one redo log record associated with an identifier within the range of redo log record identifiers.

20. The system of claim 16, wherein the request to restore the database to the previous state specifies a date and time to which the database is to be restored, and wherein the date and time is converted to a log sequence identifier associated with the date and time.

* * * * *